(12) United States Patent
Yamaguchi et al.

(10) Patent No.: US 7,422,372 B2
(45) Date of Patent: Sep. 9, 2008

(54) BEARING AND DEVELOPING APPARATUS

(75) Inventors: Yoshimasu Yamaguchi, Kawasaki (JP); Takeshi Tsuchida, Toride (JP); Minoru Nada, Tokyo (JP); Yoshitaka Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/434,875

(22) Filed: May 17, 2006

(65) Prior Publication Data

US 2006/0269180 A1 Nov. 30, 2006

(30) Foreign Application Priority Data

May 25, 2005 (JP) .............................. 2005-152147

(51) Int. Cl.
*F16C 33/78* (2006.01)
(52) U.S. Cl. ...................... 384/484; 384/485; 384/492; 384/515
(58) Field of Classification Search ................ 384/477, 384/484, 486, 492, 515, 539
See application file for complete search history.

(56) References Cited

U.S. PATENT DOCUMENTS

| | | | | |
|---|---|---|---|---|
| 3,212,833 A | * | 10/1965 | Sloan et al. | 384/492 |
| 3,224,821 A | * | 12/1965 | Barr | 384/484 |
| 3,230,022 A | * | 1/1966 | Znamirowski | 384/515 |
| 4,113,328 A | * | 9/1978 | Vander Meulen | 384/482 |
| 4,951,599 A | * | 8/1990 | Damji | 399/90 |
| 5,605,401 A | * | 2/1997 | Kondo et al. | 384/492 |

FOREIGN PATENT DOCUMENTS

| | | |
|---|---|---|
| JP | 6-175481 A | 6/1994 |
| JP | 9-273546 A | 10/1997 |

* cited by examiner

*Primary Examiner*—Thomas R Hannon
(74) *Attorney, Agent, or Firm*—Fitzpatrick, Cella, Harper & Scinto

(57) ABSTRACT

A bearing includes: an outside portion; an inside portion which is rotatably assembled to the outside portion; a rotating body arranged in a space formed when the outside portion and the inside portion are assembled; a first sealing portion which is integrally molded with the outside portion and seals the space by abutting against the inside portion through elastic deformation caused when assembled; and a second sealing portion which is integrally molded with the inside portion and seals the space by abutting against the outside portion through elastic deformation caused when assembled.

14 Claims, 9 Drawing Sheets

PRIOR ART

BEARING AND DEVELOPING APPARATUS

BACKGROUND OF THE INVENTION

1. Field of the Invention

The present invention relates to a bearing which seals a space between an outer ring and an inner ring, and a developing apparatus using the bearing.

2. Description of the Related Art

Conventionally, a bearing has been known as a shaft supporting means holding a rotating shaft. This bearing smoothly rotates an inner ring 201 by a configuration, as shown in, for example, FIG. 9, in which a plurality of balls 203 held with a retainer 202 at a predetermined interval are interposed between an outer ring 200 and an inner ring 201.

However, rolling of the balls is obstructed by dirt which enters into spaces formed by the outer ring 200, the inner ring 201, and a ball 203 because the spaces are made as small as possible in order to remove looseness.

Then, there are some cases in which a sealing member 204 is mounted on the side surface of the outer ring 200 and the inner ring 201 in order to prevent damages to grooves on the rings and the ball 203. Generally, this sealing member 204 is configured not to easily be detached, based on a configuration in which the sealing member 204 is formed of doughnut-shaped thin sheet metal, and the outer diameter portion of the metal 204 engages with a groove 200a provided on the outer ring 200, using the spring characteristics.

Moreover, grease can be filled into the bearing as a lubricant in the case of a metal bearing. Thereby, the mechanically contacting portions of the bearing can be lubricated with the grease to improve the durability of the bearing.

Here, when a sealed bearing is formed of plastic, a material, which is provided with resistance to chemical attack and the like by lubricating grease filled in the bearing and has high wear resistance, is required to be worked with high accuracy. Recently, a high-performance material has been developed and provided, especially, in a field of engineering plastic. Thereby, a bearing made of plastic has been developed (Japanese Patent Application Laid-Open No. 9-273546).

The above-described bearing has been widely used for an image forming apparatus. For example, a spacer roller is disposed between a developing apparatus and a photosensitive drum, and some of the spacer rollers are obtained by specially fitting plastic to the surroundings of an outer ring in a metallic bearing (Japanese Patent Application Laid-Open No. 6-175481).

An electrophotographic type image forming apparatus forms an image, using toner. Because the toner is fine powder, the toner is dispersed and easily enters into a bearing to have a possibility that rolling of the ball is obstructed. Recently, the particle size of the toner for an electrophotographic type image forming apparatus has become finer and finer as digitization and colorization proceed. Thereby, bearings used for the above-described image forming apparatus have been required to have excellent sealing properties.

However, there has been a problem that higher costs and more complex structures are required because a higher working accuracy is required in the case of a metal sealed bearing. Moreover, there is absolutely caused a space in the case of sealing between metals to invite a possibility that fine toner powder enters into the space even through a minute gap.

Moreover, in the bearing made of plastic shown in Japanese Patent Application Laid-Open No. 9-273546, an auxiliary ring different from the outer ring and the inner ring is prepared, and the auxiliary ring is fitted to between the side surfaces of the outer ring and the inner ring as a sealing member. As a process for fitting the sealing member has been required as described above, and there is a gap between the auxiliary ring and the inner ring, complete sealing has been difficult.

SUMMARY OF THE INVENTION

The present invention has been made, considering the above-described circumstances, and an object of the invention is to provide a bearing, which is easily worked and assembled, and has excellent sealing properties, and a developing apparatus using the bearing.

In order to achieve the above-described object, the bearing has: an outside portion; an inside portion which is rotatably assembled to the outside portion; a rotating body arranged in a space formed when the outside portion and the inside portion are assembled; a first sealing portion which is integrally molded with the outside portion and seals the space by abutting against the inside portion through elastic deformation caused when assembled; and a second sealing portion which is integrally molded with the inside portion and seals the space by abutting against the outside portion through elastic deformation caused when assembled.

Moreover, in order to achieve the above-described object, the developing apparatus has: a developing agent bearing member which bears and conveys a developing agent by rotating, and develops an electrostatic image on an image bearing member; and a bearing fitted to the developing agent bearing member, wherein the bearing includes; an outside portion; an inside portion which is rotatably assembled to the outside portion; a rotating body arranged in a space formed when the outside portion and the inside portion are assembled; a first sealing portion which is integrally molded with the outside portion and seals the space by abutting against the inside portion through elastic deformation caused when assembled; and a second sealing portion which is integrally molded with the inside portion and seals the space by abutting against the outside portion through elastic deformation caused when assembled.

DESCRIPTION OF THE EMBODIMENTS

Then, a bearing and an image forming apparatus using the bearing according to one embodiment of the present invention will be explained, referring to drawings.

First Embodiment

{Overall Configuration of Image Forming Apparatus}

Figure 1:
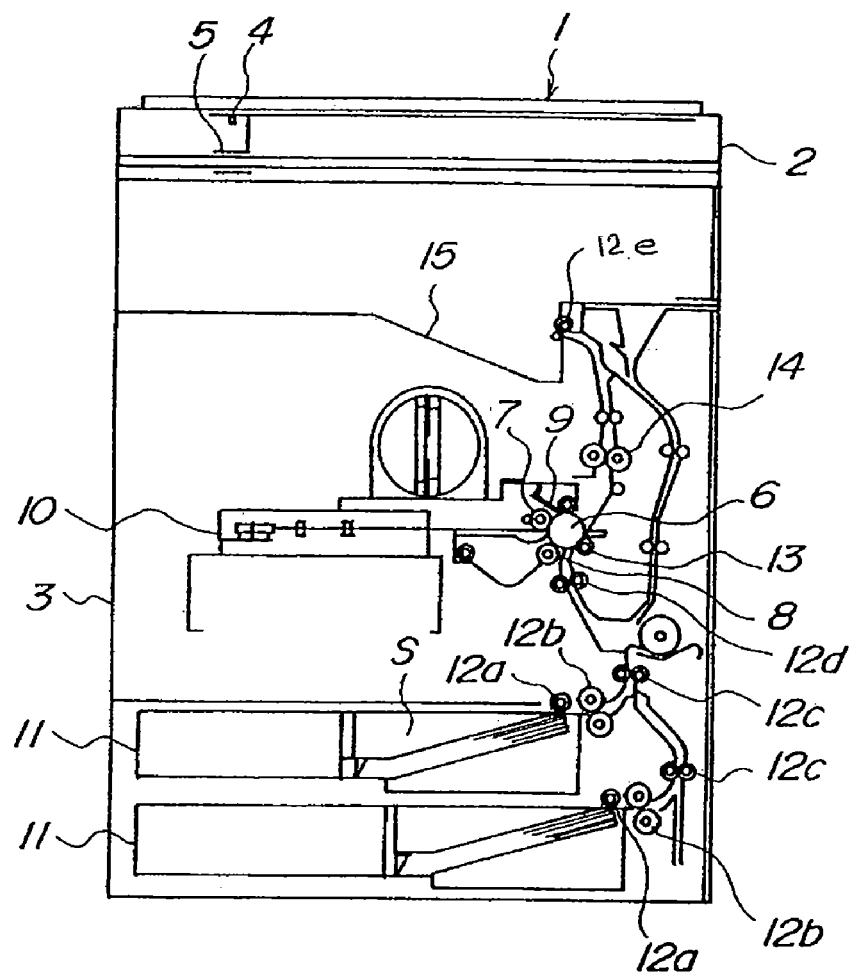
FIG. 1 is an explanatory view of the section of the image forming apparatus according to a first embodiment of the present invention.

In the first place, the overall configuration of the image forming apparatus according to the present embodiment, together with image forming operations, will be explained, referring to FIG. 1. Here, FIG. 1 is an explanatory view of the section of the image forming apparatus according to the first embodiment.

In the image forming apparatus according to the present embodiment, an image reading portion 2 is arranged in the upper part of the main body 1 of the apparatus, and an image formation device 3 is arranged under the main body 1 of the device.

The image reading portion 2 has a configuration in which, when an original is set on an original base plate 3, and a reading key is pushed, the original is exposed to light from a light source 4, and reflected light is converted into a digital signal in a photoelectric transducer 5 such as a CCD.

In the image formation device 3, an image is formed according to an electrophotographic type method, based on the above-described digital signal. Accordingly, a charge roller 7, a developing apparatus 8, and a cleaning apparatus 9 are arranged around a photosensitive drum 6 as an image bearing member. The peripheral surface of the rotating photosensitive drum 6 is uniformly charged by applying a force to the charge roller 7, and an electrostatic latent image is formed by exposing the photosensitive drum 6 to light which is irradiated from the laser scanner device 10 according to the digital signal. The latent image is visualized by toner developing with the developing apparatus 8.

A recording medium S is conveyed in synchronization with the image formation from a sheet cassette 11 installed in the lower part of the image forming apparatus 1 to a nip position between the photosensitive drum 6 and a transfer roller 13 through a feed roller 12a, a separation roller 12b, a conveying roller 12c, and a registration roller 12d. Then, a toner image formed on the above-described photosensitive drum 6 is transferred onto the recording medium S by applying a force to the transfer roller 13.

The recording medium S onto which the toner image is transferred is conveyed upward, and is discharged to a discharging portion 15 through a discharging roller 12e after the toner image is heated and fixed in a piece of fixing apparatus 14.

{Developing Apparatus}

Figure 2:
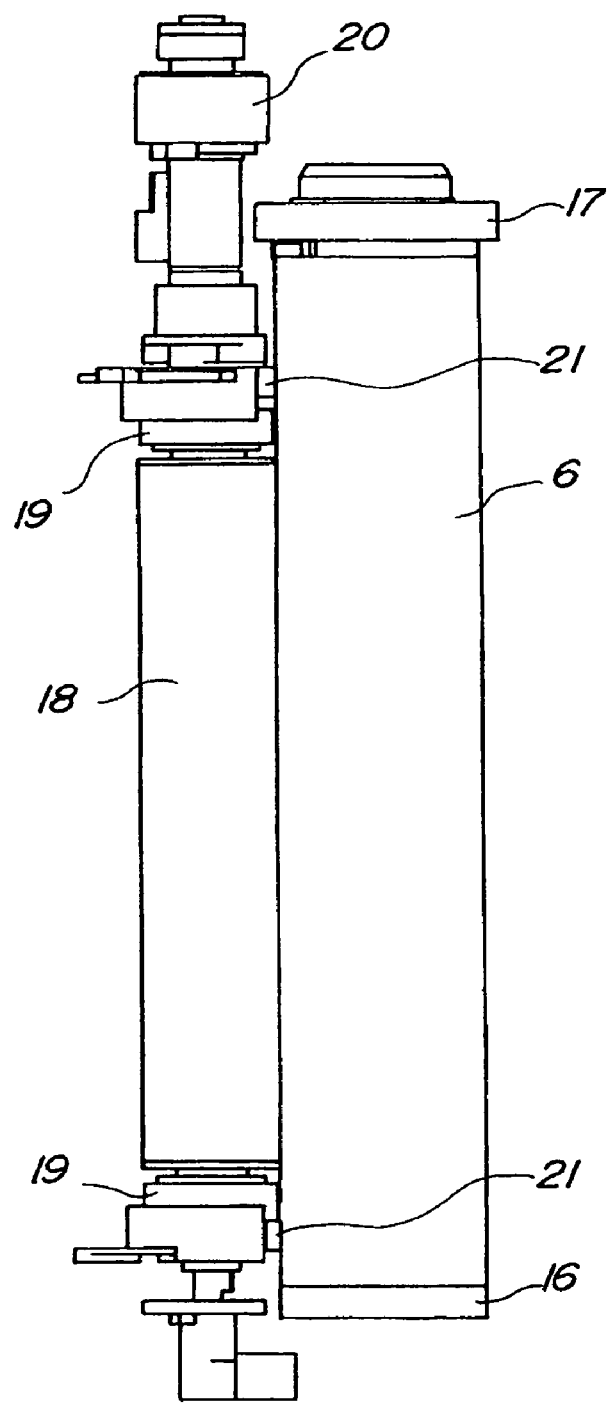
FIG. 2 is an approximately plan view of a developing unit and a photosensitive drum.

Subsequently, the principal configuration of the developing apparatus 8 in the above-described image formation device 3 will be explained, referring to FIG. 2. FIG. 2 is an explanatory view of a developing roller and the photosensitive drum which are included as a principal portion in the developing apparatus.

The photosensitive drum 6 is rotatable by a configuration in which a drum flange 16 is fixed at one end, and a drum gear 17 is fixed to the other end in the longitudinal direction to transmit driving force to the drum gear 17. A developing roller 18 is rotatably provided, facing the peripheral surface of the photosensitive drum 6.

The shaft of the developing roller 18 is rotatably supported on a housing at the both ends in the longitudinal direction through bearings 19, and is rotatable by transmission of driving force to a roller gear 20 fitted at one end in the longitudinal direction. The developing roller 18 is facing the peripheral surface of the photosensitive drum 6 with an infinitesimal gap, and a toner layer is formed on the roller peripheral surface by attracting force of a magnet provided therein. And, at developing, toner is supplied according to the latent image formed on the photosensitive drum 6 for toner developing by applying a developing bias to the developing roller 18.

The bias voltage is connected to the ground of a power supply portion through a cylinder-like metal cylinder as a base material of the photosensitive drum in the lower part of photosensitive layer. In the above configuration, the jumping amount of the toner is changed according to the thickness of the toner layer on the developing roller 18 when the latent image appears as a visible image. The photosensitive drum 6 and the developing roller 18 are required to be arranged with an appropriate infinitesimal gap from each other, and the gap is also required to be stable. Accordingly, butting rollers 21 are fitted at a location at the both sides of the developing roller 18 in the longitudinal direction and out of an image formation region. The butting roller 21 has an outer diameter slightly larger than that of the developing roller 18, and the developing roller 18 and the photosensitive drum 6 rotate with a predetermined infinitesimal gap by applying the butting rollers 21 against the peripheral surface of the photosensitive drum 6.

Though a bias voltage is applied to the developing roller 18, and, at the same time, is connected to the ground through the photosensitive drum 6 in the above-described developing apparatus 8, it has been known that the above configuration has a problem that voltage fluctuation and noise have a bad influence upon images. In order to solve the problem, it has been desired that the path to the ground is divided.

However, when the developing roller 18 is supported with a metallic bearing, direct grounding is formed, and images are very susceptible to noise caused by an electromagnetic clutch and a driving motor in the neighborhood. Consequently, in the image forming apparatus according to the present embodiment, a plastic bearing is used for the bearing 19, which rotatably supports the developing roller 18 as a rotating member, and the butting roller 21. Thereby, the shaft of the photosensitive drum with a ground of the photosensitive drum 6 and the ground of a driving unit are divided to realize direct connection to the ground of the power supply portion through a drum ground and a drum ground spring, furthermore, through a lead line and the like. Moreover, electric influence by noise is minimized because a distance to other metal components of the driving unit may be secured.

{Configuration of Bearing}

Figure 3:
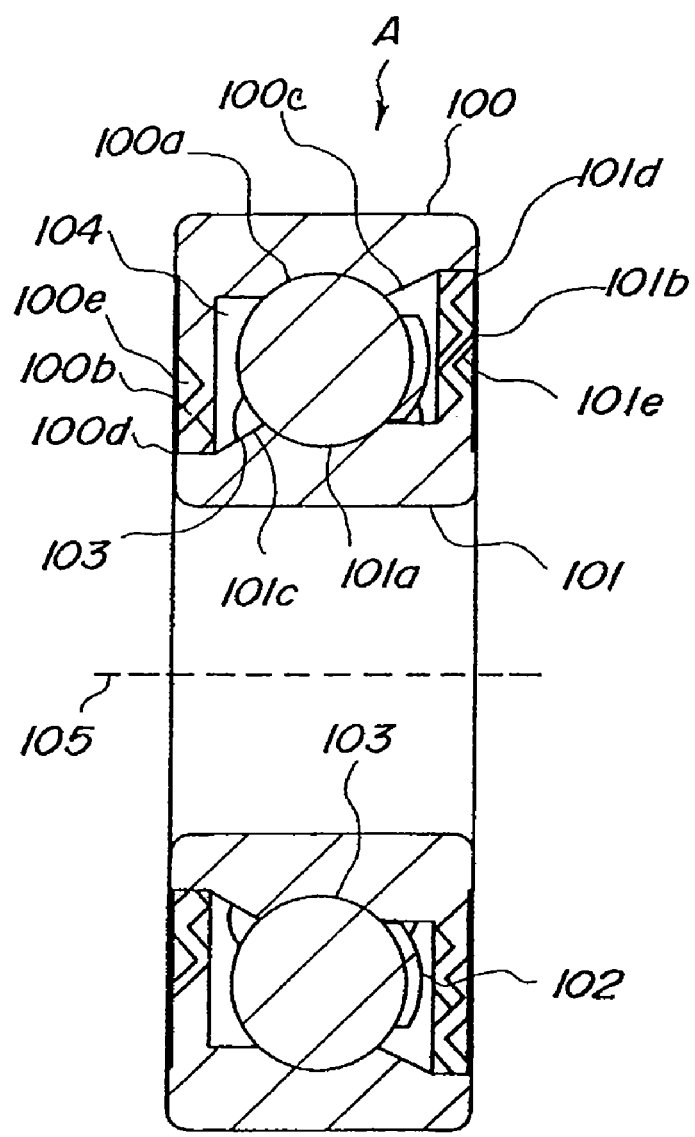
FIG. 3 is a view of the longitudinal section of a seal type bearing made of plastic according to the first embodiment.

Subsequently, the above-described plastic bearing A will be explained. FIG. 3 is an explanatory view of the longitudinal section of a seal type bearing made of plastic.

The bearing A in the present embodiment is a ball bearing with a configuration in which a ball 103 (rotating body) is interposed between an outer ring 100 (outside portion) made of plastic and an inner ring 101 (inside portion) made of plastic. The outer ring and the inner ring are configured to relatively move (rotate) to each other around a rotation axis 105. Here, the ball (rotating body) 103 is formed of, for example, metal or resin.

In FIG. 3, an arc-shaped ball groove 100a which holds and guides the ball 103 is provided on the inside surface of the outer ring 100. Moreover, an elastic sealing portion 100b, which is integrally molded, is extended in one of the side surfaces of the outer ring 100. Moreover, a sloping surface 100c is provided in the side opposite to that of the sealing portion 100b across the ball groove 100a.

On the other hand, an arc-shaped ball groove 101a which holds and guides the ball 103 is provided on the outside surface of the inner ring 101. Moreover, a sealing portion 101b, which is integrally molded, is extended in the other of the side surfaces of the inner ring 101 (the side surface opposing to the side surface on which the sealing portion 100b of the outer ring 100 is provided) in the same manner as that of the outer ring 100. Moreover, a sloping surface 101c is provided in the side opposite to that of the sealing portion 101b across the ball groove 101a.

Figure 4:
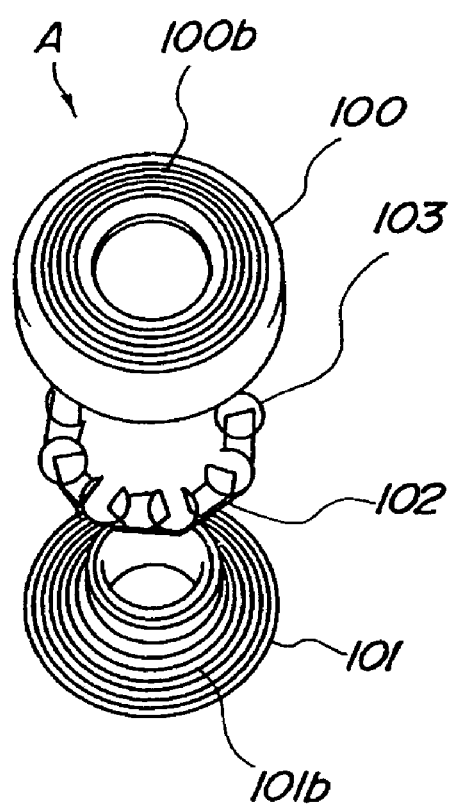
FIG. 4 is an exploded view of a plastic sealed bearing.

In assembling of the bearing A, as shown in FIG. 4, a retainer 102 holding the balls 103 engages with the side surface of the inner ring 101, and the ball 103 engages with each of holding portions disposed at equal intervals on the outer edge of the retainer 102. Subsequently, the inner ring 101 is pushed along the sloping surface 100c and the outer ring 100 is pushed along the sloping surface 101c by applying pressure to the inner ring 101 and the outer ring 100 in the horizontal direction so that the ring 101 and the ring 100 are integrated into one piece. Thereby, the ball 103 may engage with between the ball groove 100a of the outer ring 100 and the ball groove 101a of the inner ring 101, using the elasticity of plastic. At this time, the retainer 102 may have a snap fit configuration by plastic molding for easy holding of the ball 103.

The bearing A according to the present embodiment has a configuration in which, as shown in FIG. 3, the tip 100d of the sealing portion 100b in the outer ring 100 is abutted against the inner ring 101, and the tip 101d of the sealing portion 101b in the outer ring 101 is abutted against the outer ring 100.

Moreover, an ring-like uneven portion 100e with an uneven shape are provided in the sealing portion 100b, and an ring-like uneven portion 101e with an uneven shape are provided in the sealing portion 101b. Thereby, the elasticity is secured. A contacting location at which the outside line of the sealing portion 100b contacts with the inner ring 101 and a contacting location at which that of the sealing portion 101b contacts with the outer ring 100 are configured to radially overhang. Moreover, the ring-like uneven portions 100e and 101e with a groove shape provided at both the inner and outer ends in the sealing portions 100b and 101b, respectively, are formed like a thin walled bellows. Then, when the outer ring and the inner ring are assembled, the uneven portions as a sealing portion are elastically deformed and are abutted against respective destinations for sealing.

Thereby, the tip 100d is abutted against the ring surface of the inner ring 101, and the tip 101d is abutted against the ring surface of the outer ring 100 because the elasticity is given to the sealing portions 100b and 101b.

Therefore, the sealing properties of the inside of the bearing A may be secured to prevent fine toner and dirt from entering into the inside. Furthermore, grease 104 may be filled as a lubricant in the inside, and grease with a viscosity lower than that of conventional grease may be used because a certain degree of sealing properties are secured in the inside of the bearing A. And enough lubricating effects may be given to the ball grooves 100a and 101a as orbit portions of the ball, the sealing tip 100d as a sliding portion in the sealing portion 100b, and the sealing tip 101d as a sliding portion in the sealing portion 101b.

Here, though the groove formed as the uneven portions 100e and 101e have V shape in the sealing portions 100b and 101b according to the present embodiment, the grooves may have an arbitrary shape such as a vertically-U shape, or a horizontally-U shape. Moreover, the number of the grooves and the depth of each groove may be arbitrarily set according to the size of the bearing. And, a configuration in which the filled grease 104 enters into the grooves has an advantage that the grooves are used as a reserving means for reserving oil by which oil starvation on the sealing tips 100d and 101d as a seal sliding portion is removed.

Moreover, electrical insulation may be easily realized by using the plastic bearing A with the above-described configuration as the bearing 19 supporting the developing roller 18.

Moreover, the photosensitive drum 6 and the developing roller 18 more smoothly rotate by using the plastic bearing A with the above-described configuration as the butting roller 21. Furthermore, the butting roller 21 may rotate without adverse effects because toner dispersed in the vicinity of the roller 21 is prevented from entering into the roller.

Moreover, there may be obtained an effect that the bias voltage applied to between the developing roller 18 and the photosensitive drum 6 may be appropriately applied to the toner image formation region, and, at the same time, an insulation distance is secured so that there is caused no leak out of an image formation region. Thereby, the reliable image formation device may be cheaply established and the image quality may be also improved.

Here, plastic excellent in, especially, the sliding properties, the strength, the elasticity, and the dimensional stability is preferably selected as the material of plastic used for the plastic bearing A in the present embodiment from among so-called engineering plastic. Therefore, when an adequate sliding properties are required for the inner ring 101 and the outer ring 100, a material in which a fluorine compound and the like for lubricating is kneaded with polyoxymethylene (POM) plastic, or polyamide (PA) plastic as a base is preferably used for the rings to improve the elasticity and the wear resistance of POM and PA.

Moreover, when a material which is adequate in the strength, the durability, the dimensional stability, and the like is required, it is recommendable to use a material made of, for example, polycarbonate with high strength and, at the same time, appropriate elasticity. Furthermore, when insulating properties as electrical properties are required, molding is executed, using polybutylene terephthalate (PBT). As described above, a materials to be used may be selected according to the usage patterns.

It is recommendable not to use the same material for the sealing portions 100b and 101b in order to improve the wear resistance therefor, and the durability may be remarkably improved by using a different material for each of the inner ring 101 and the outer ring 100. Thereby, the wear degree of the sliding surface may be reduced by, for example, a combined configuration in which the material of the inner ring 101 is made of PA, and that of the outer ring 100 is made of POM.

Moreover, the retainer 102 may be made of POM or PA with excellent lubricating properties and better wear resistance, because the retainer 102 is required to have characteristics suitable for a snap fit, and adequate sliding properties.

Moreover, when grease is filled, it has been known that there is a problem associated with compatibility between plastic and grease. That is, grease causes a chemical attack on plastic in some cases. Accordingly, there is caused a possibility that the deterioration with passage of time, or the deterioration by aging is caused, depending on the usage, and the original strength of the plastic is reduced to cause cracks. Silicon lubricating oil suitable for lubricating plastic may be used in order to solve the above problems.

Moreover, when the bearing is required to meet electrical safety standards, the bearing may be used in a location, such as an electrical components, with a firing risk by selecting a material of a flame retardant grade (for example, UL94V-0 or over). As, for example, POM is of a UL94-HB grade and flammable, POM is not allowed to be used. However, polycarbonate, PA, and the like may meet a UL94V-0 grade.

A plastic sealed bearing with various kinds of usage, other than the above-described usage as the bearing 19 supporting the developing roller or the butting roller 21, may be provided by best selection of materials in the above-described manner in the bearing A according to the present embodiment.

Moreover, one of the characteristics of the plastic bearing with which the sealing portions 100b and 101b come in contact is that the fine vibration may be absorbed by the elasticity unique to plastic without causing abnormal wear such as fretting corrosion due to fine vibration. Accordingly, vibration caused in the rotation shaft may be damped. Therefore, when the bearing is used in the image forming apparatus, vibration in the photosensitive drum 6 and the developing apparatus 8, in which vibration is disliked, is controlled to obtain a unique advantage that image quality is improved in an image formation process. Moreover, the bearing may be preferably used for a bearing portion in the driving unit, other than the image forming apparatus. In the above case, there is an advantage that vibration may be controlled, and, at the same time, noise generation may be suppressed.

Second Embodiment

Figure 5:
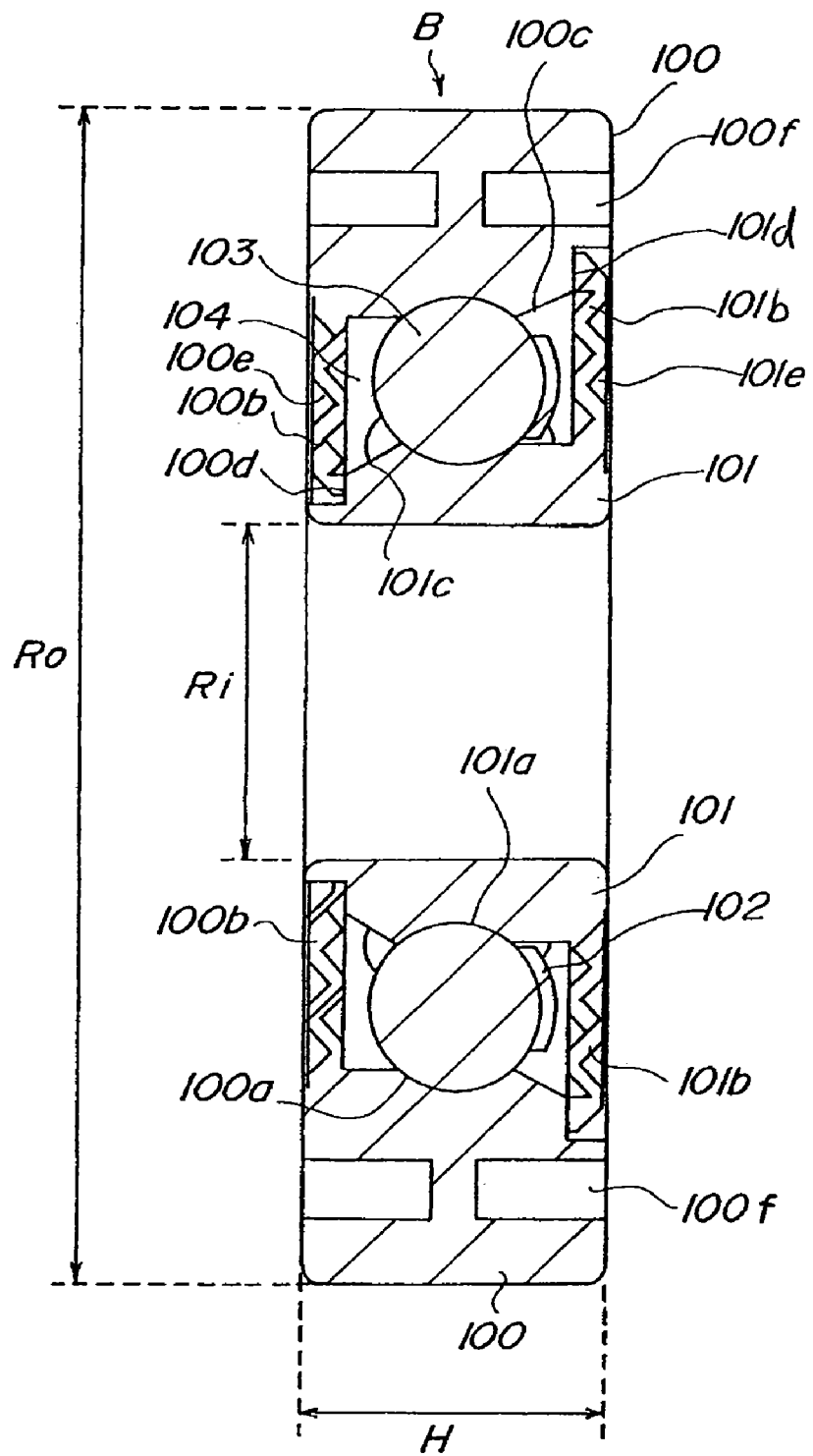
FIG. 5 is a view of the longitudinal section of a plastic bearing after plastic sealing according to a second embodiment.

Subsequently, a bearing B according to a second embodiment will be explained, referring to FIG. 5 and FIG. 6. Here, as the bearing B according to the present embodiment has the same basic configuration as that of the above-described bearing A in the first embodiment, the overlapped explanation will not be described, and, hereinafter, only the characteristic portions of the present embodiment will be explained. Moreover, members with similar functions to those previously described with reference to the previous embodiment are denoted by the same reference numbers as those in the previous embodiment.

The bearing B according to the present embodiment has a configuration in which a tip 100d of a plastic sealing portion 100b is abutted against the side of an inner ring 101, and a tip 101d of a plastic sealing portion 101b is abutted against the side of an outer ring 100. And, the dimensions of the components are set so that the sealing tip 100d overhangs as bent inward from the outside line of the inner ring 101, and the sealing tip 101d overhangs as bent inward from the outside line of the outer ring 100 as shown in FIG. 6. Thereby, these components are assembled so that the sealing tip 100d is pushed and bent toward the side of the corresponding inner ring 101 and the sealing tip 101d is pushed and bent toward the side of the corresponding outer ring 100.

Accordingly, when the sealing portions 100b and 101b are pushed outward, a force is applied in the sealing portions 100b, 101b. That is, the sealing portion 100b is securely abutted against the corresponding inner ring 101, and the sealing portion 101b is securely abutted against the corresponding outer ring 100. At the same time, the sealing properties are improved. There is a gap for a run off in the diametral direction of the outer ring 100 corresponding to the outer diameter of the sealing portion 100b, and there is also a gap for a run off in the diametral direction of the inner ring 101 corresponding to the outer diameter of the sealing portion 101b.

In the bearing A according to the first embodiment a force for sealing has been applied by defining the dimensions for the outer and inner diameters at the tip portions of the sealing portions 100b and 101b. However, as the force is applied to the side surfaces of the inner ring 101 and the outer ring 100, and the dimensions for the outer and the inner diameters are not required in the present embodiment, the sliding load and the variations in the sliding loads may be further reduced when the bearing B is rotated.

Moreover, a hollow run off portion 100f (groove portion) is provided in the outer ring 100. Thereby, when the outer dimension is large, or the bearing is oddly formed, the run off portion becomes thick (BOTE-NIKU) to prevent reduction in the dimensional accuracy of the ball orbit portion, wherein the reduction is caused by shrinkage unique to plastic molding.

The shape of an outside portion of the run off portion 100f may be freely decided by providing the runoff portion 100f. For example, a gear shape and a timing pulley shape may be acceptable, and, moreover, the portion may be also molded in one piece with a lever, an actuator, and the like.

Furthermore, the amount of scatter in the dimension may be decreased to improve the accuracy because the number of other components interposing between the inner ring 101 and the outer diameter of the outer ring 100 may be controlled at the minimum one.

Conventionally, another component has been required to engage with, press-fitted onto, or bonded to the outer periphery of a metallic bearing when the same function is executed. However, the bearing B according to the present embodiment may obtain a synergistic effect of high accuracy and low cost, which are caused by integration, by integral molding and by providing the shrinkage prevention groove.

Moreover, all the components in the bearing B may be made of plastic, because the ball 103 and the retainer 102 may be made of resin. Accordingly, electrical insulation may be secured between the inner ring and the outer ring, and an insulating bearing of plastic may be provided, though a metallic bearing may not be an insulating material.

Here, the bearing B has the same configuration as that of the bearing A according to the first embodiment in a point in which the uneven portions 100e and 101e are provided in the sealing portions 100b and 101b to secure the elasticity.

Figure 6:
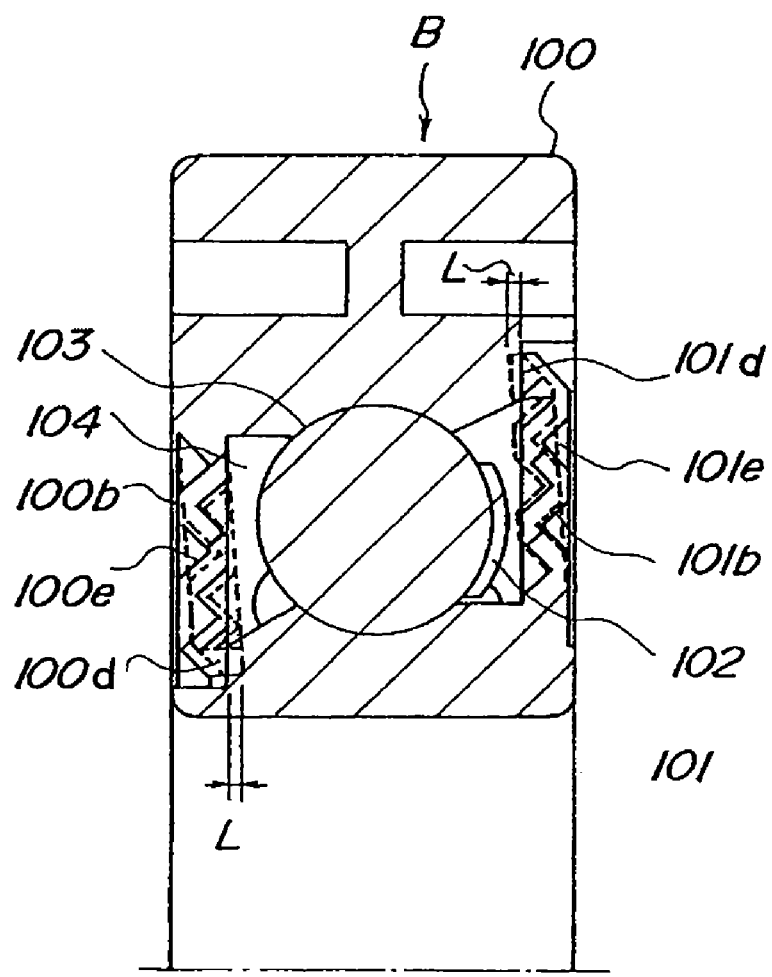
FIG. 6 is a partial sectional view showing the details of FIG. 5.

The sealing portions 100b and 101b are molded in an inclined state as a single component so that, as shown in FIG. 6, a contacting location at which the outside line of the sealing portion 100b contacts with the inner ring 101 and a contacting location at which that of the sealing portion 101b contacts with the outer ring 100 are configured to overhang inward as shown with a reference sign L. The present embodiment has a configuration in which the inner diameter Ri of the shaft portion in the bearing B is 8 mm, the outer diameter Ro of the shaft portion in the bearing B is 22 mm, and the width H is 7.5 mm. According to the above configuration, the assumption that the dimension L is a bending amount of 0.1 mm through 1 mm is preferable because a damping (vibration absorbing) function corresponding to the sliding friction force may be obtained by the bending amount. Here, when the bearing according to the present invention is fitted to the developing roller 18, the development roller with the outer diameter is configured to engage with as the inner diameter Ri of the bearing.

Moreover, as a sealing pressure may be reduced when the grease 104 is not used, or when the viscosity of the grease is increased to cause no possibility of leakage, the bending amount L is allowed to be made smaller. That is, the above configuration has a principal object that dirt is prevented from entering from the outside into the inside of the bearing. As the loading becomes lighter in this case, torque loss at rotating may be maintained at the minimum level.

Here, it is preferable that the sealing thickness of the uneven portions 100e and 101e with an uneven shape is set at about 0.3 mm through about 0.7 mm, wherein the uneven portions are formed like a bellows on the side of the sealing portions. When the sealing thickness is reduced to a thinner dimension than the above-described one, molding liquidity becomes low to caused short molding and the yields is reduced, depending on the kinds of plastic. Moreover, when the sealing thickness is increased to a thicker dimension than the above-described one, the elasticity is reduced and the sliding friction force of the sealing portions 100b and 101b is increased.

However, the present invention is not limited to the above-described dimensions, and the dimensions may be freely set, depending on the elasticity of a thin-walled bellows at the side of a sealing portions.

Third Embodiment

Figure 7:
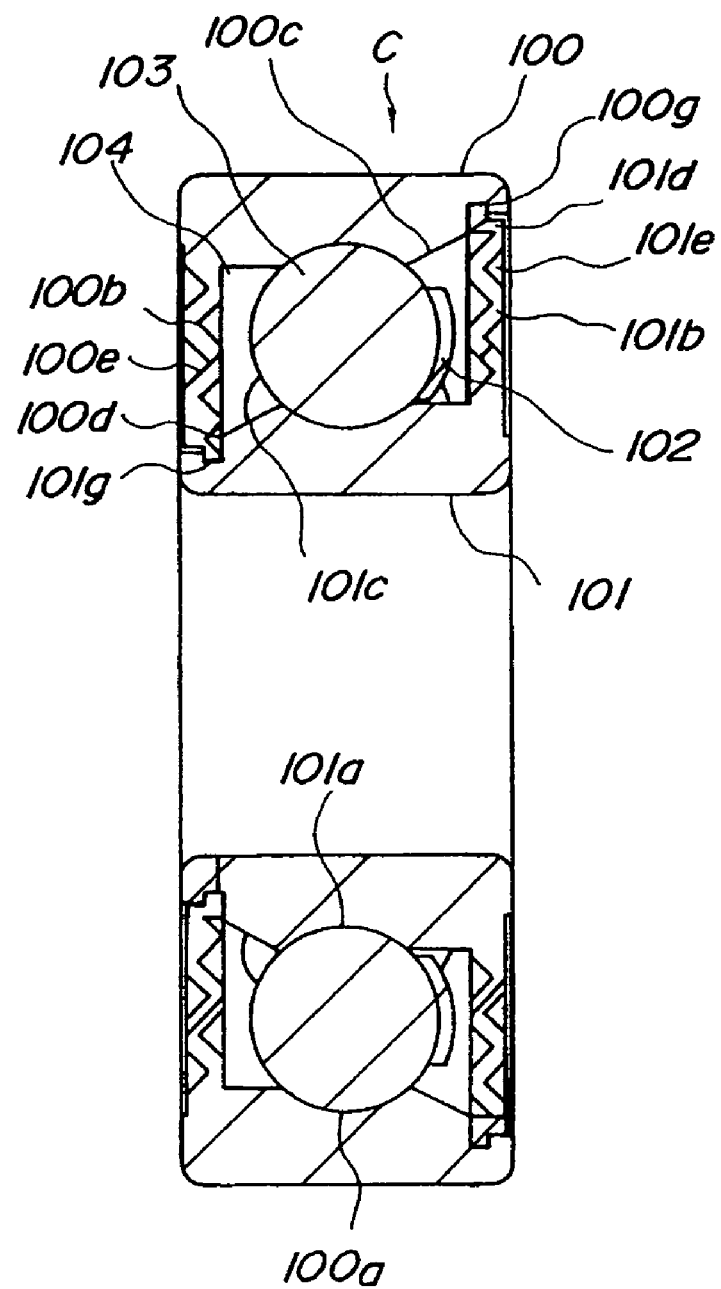
FIG. 7 is a view of the longitudinal section of a plastic bearing in the case where plastic sealing according to a third embodiment is performed.

Subsequently, a bearing C according to a third embodiment will be explained, referring to FIG. 7 and FIG. 8. Here, as the bearing C according to the present embodiment has the same basic configuration as that of the above-described bearing A in the first embodiment, the overlapped explanation will not be described, and, hereinafter, only the characteristic portions of the present embodiment will be explained. Moreover, members with similar functions to those previously described with reference to the previous embodiment are denoted by the same reference numbers as those in the previous embodiment.

The present embodiment has a different configuration for the tip abutting of a sealing portion from a configuration of the above-described embodiments. FIG. 7 is an explanatory view of the longitudinal section of sealing portion of the bearing C made of plastic. In FIG. 7, a snap fit portion 100g which is a groove portion, which the above-described tip 100d may engage, is provided in the tip 100d of a plastic sealing portion 100b, and a corresponding inner ring 101, and a snap fit portion 101g which is a groove portion, with which the above-described tip 101d may engage, is provided in the tip 101d of a plastic sealing portion 101b, and a corresponding outer ring 100.

Reliable sealing is required so that seal deformation, grease leakage, and the like are prevented from being generated, when the sealing portions receive loading caused by temperatures and rotation pressures on bearings and the like. According to the present embodiment, the plastic sealing tip 100d engages with and locked into the corresponding groove portion through the snap fit portion 100g, and the plastic sealing tip 101d engages with and is locked into the corresponding groove portion through the snap fit portion 101g. Thereby, the above tips 100d and 101d never get out the corresponding groove portion, and sealing is secured not to cause grease leakage and the like.

Moreover, fine toner, dirt, and the like are prevented from entering into the sealing portions from the outside because the tips engage with the groove portions with an uneven shape to secure reliable sealing.

As grooves formed with the uneven portions 100e and 101e are provided on the sides of the plastic sealing portions, the sealing portions 100b and 101b are thin-walled. Thereby, the sealing tip 100d may be easily bent when the sealing tip 100d engages with the snap fit portion 101g, and the sealing tip 101d may be easily bent when the sealing tip 101d engages with the snap fit portion 100g.

Figure 8:
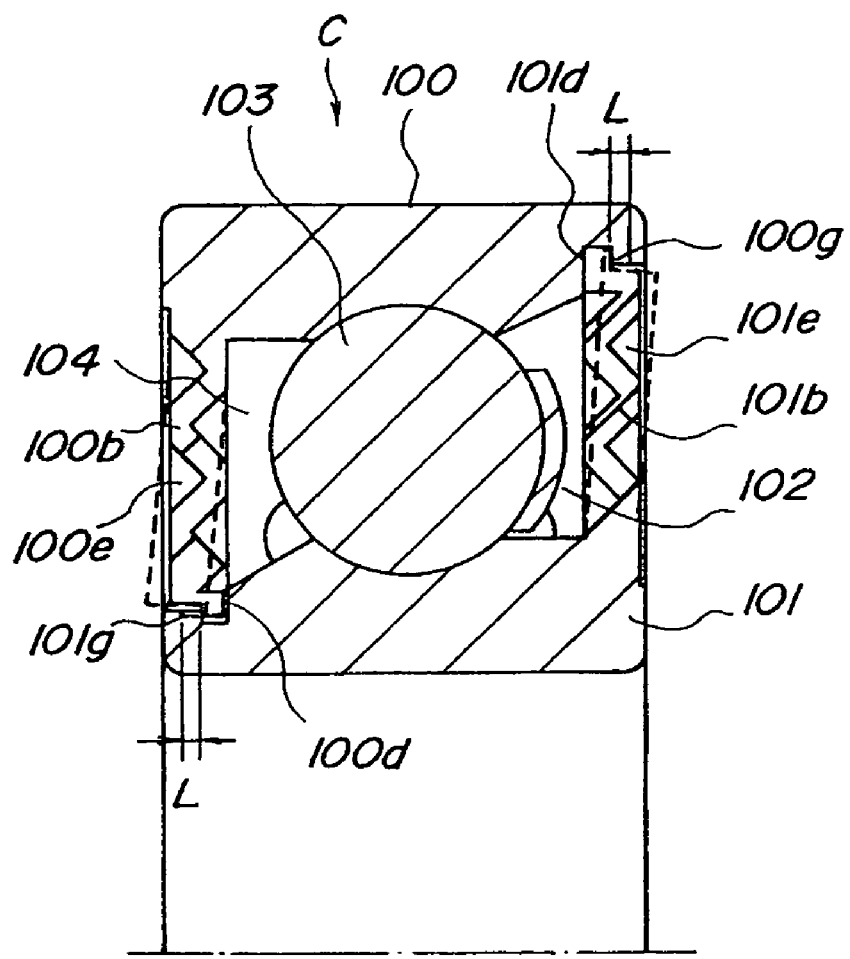
FIG. 8 is a partial sectional view showing the details of FIG. 5.
Figure 9:
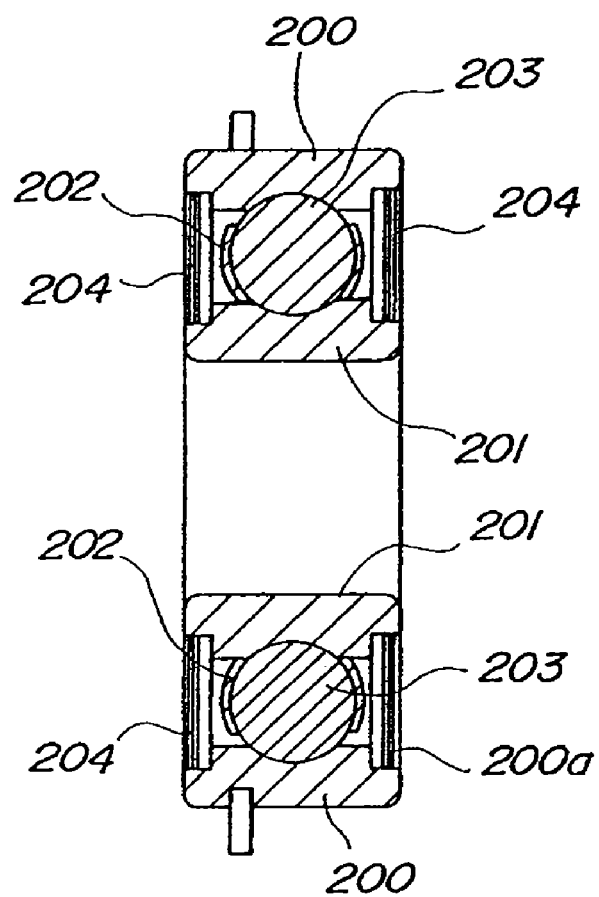
FIG. 9 is an explanatory view of a bearing according to a conventional technology.

The plastic sealing portions 100b and 101b are molded in an inclined state as a single component so that, as shown in FIG. 8, a contacting location at which the outside line of the sealing portion 100b contacts with the inner ring 101 and a contacting location at which that of the sealing portion 101b contacts with the outer ring 100 are configured to overhang outward as shown with a reference sign L. Then, reaction force caused by bending becomes energizing force for sealing by putting the snap fit portions 100g and 101g in an engaging state as a normal state.

Here, in a similar manner to the bearing B of the above-described second embodiment, the present embodiment is assumed to have a configuration in which the inner diameter of the shaft portion in the bearing C is 8 mm, the outer diameter of the shaft portion in the bearing C is 22 mm, and the width of the bearing C is 7.5 mm. According to the above configuration, the assumption that the dimension L is a bending amount of 0.1 mm through 1 mm is preferable because a damping (vibration absorbing) function corresponding to the sliding friction force may be obtained by the bending amount. Moreover, based on the same reason as that of the above-described second embodiment, it is preferable that the thickness of the sealing portions 100b and 101b is set at about 0.3 mm through about 0.7 mm.

Moreover, as a sealing pressure may be reduced when grease is not used, or when the viscosity of the grease is increased to cause no possibility of leakage, the bending amount L is allowed to be made smaller in a similar manner to that of the above-described second embodiment.

Other Embodiments

Though the ball bearing has been illustrated in the above-described embodiments, a bearing according to the present invention is not required to be limited to the configuration in which the rotating member is the ball, and a configuration in which the member is another type of a member such as a roller may be acceptable.

Moreover, it may be obviously accepted that a bearing is assumed to support a driving transmission system other than that of the image forming apparatus, or other rotating member though the example in which the ball bearing is used for the bearing portion or the butting roller in the rotating member of the image forming apparatus has been illustrated in the above-described embodiments.

The plastic bearing according to the present invention may improve the reliability of a bearing portion by using a material with no possibility of metallic corrosion and with chemical resistance when the bearing is applied to a field in which a conventional metallic bearing has not been used, for example, to a field treating with chemicals.

Moreover, as all components may be made of plastic, the bearing according to the present invention may be used in, for example, the water.

Furthermore, as plastic has a lower density and a lighter weight in comparison with metal, a better efficiency may be expected when used in transportation equipment such as an aircraft and a car, because the light weight enhances the fuel-saving. Similarly, when the bearing is used in a machine, a machine with good responsivity may be manufactured, because small inertial force may realize a smaller machine size, better consumption efficiency of power or energy, and the like.

This application claims the benefit of priority from the prior Japanese Patent Application No. 2005-152147 filed on May 25, 2005 the entire contents of which are incorporated by reference herein.

What is claimed is:

1. A bearing, comprising:
an outside portion;
an inside portion which is rotatably assembled to said outside portion;
a rotating body arranged in a space formed when said outside portion and said inside portion are assembled;
a first sealing portion which is integrally molded with said outside portion and seals said space by abutting against said inside portion through elastic deformation caused when assembled; and
a second sealing portion which is integrally molded with said inside portion and seals said space by abutting against said outside portion through elastic deformation caused when assembled.

2. The bearing according to claim 1, wherein
said first sealing portion and said second sealing portion are provided with an uneven portion with an uneven shape.

3. The bearing according to claim 1, wherein
said inside portion has a first engaging groove portion with which a tip of said first sealing portion engages; and
said outside portion has a second engaging groove portion with which a tip of said second sealing portion engages.

4. The bearing according to claim 1, wherein
a lubricant is filled in said space.

5. The bearing according to claim 1, wherein
said outside portion and said inside portion are molded, using plastic.

6. The bearing according to claim 5, wherein
the kinds of plastic used for molding said outside portion and said inside portion are different from each other.

7. A developing apparatus, comprising:
a developing agent bearing member which bears and conveys a developing agent by rotating, and develops an electrostatic image on an image bearing member; and
a bearing fitted to said developing agent bearing member, wherein
said bearing comprises;
an outside portion;
an inside portion which is rotatably assembled to said outside portion;
a rotating body arranged in a space formed when said outside portion and said inside portion are assembled;
a first sealing portion which is integrally molded with said outside portion and seals said space by abutting against said inside portion through elastic deformation caused when assembled; and
a second sealing portion which is integrally molded with said inside portion and seals said space by abutting against said outside portion through elastic deformation caused when assembled.

8. The developing apparatus according to claim 7, wherein
said first sealing portion and said second sealing portion are provided with an uneven portion with an uneven shape.

9. The developing apparatus according to claim 7, wherein
said inside portion has a first engaging groove portion with which a tip of said first sealing portion engages; and
said outside portion has a second engaging groove portion with which a tip of said second sealing portion engages.

10. The developing apparatus according to claim 7, wherein
a lubricant is filled in said space.

11. The developing apparatus according to claim 7, wherein
said outside portion and said inside portion are molded, using plastic.

12. The developing apparatus according to claim 11, wherein
the kinds of plastic used for molding said outside portion and said inside portion are different from each other.

13. The developing apparatus according to claim 7, wherein
said bearing rotatably supports said developing agent bearing member.

14. The developing apparatus according to claim 7, wherein
said bearing maintains a preset space between said developing agent bearing member and said image bearing member by abutting against the surface of said image bearing member.

* * * * *

UNITED STATES PATENT AND TRADEMARK OFFICE
CERTIFICATE OF CORRECTION

| | | |
|---|---|---|
| PATENT NO. | : 7,422,372 B2 | |
| APPLICATION NO. | : 11/434875 | |
| DATED | : September 9, 2008 | |
| INVENTOR(S) | : Yoshimasu Yamaguchi et al. | |

It is certified that error appears in the above-identified patent and that said Letters Patent is hereby corrected as shown below:

COLUMN 3:
    Line 50, "piece of" should be deleted.

COLUMN 5:
    Line 33, "an ring-like" should read --a ring-like--.
    Line 34, "an" should read --a--.

COLUMN 6:
    Line 28, "an" should be deleted.
    Line 42, "materials" should read --material--.
    Line 67, "an" should be deleted.

COLUMN 7:
    Line 18, "disliked," should read --undesirable,--.
    Line 58, "run off" should read --runoff--.
    Line 61, "run off" should read --runoff--.

COLUMN 8:
    Line 6, "run off" should read --runoff--.
    Line 8, "run off" should read --runoff--.
    Line 13, "run off" should read --runoff--.

COLUMN 9:
    Line 7, "caused" should read --cause--; and "yields" should read --yield--.
    Line 48, "locked" should read --is locked--.
    Line 52, "out the" should read --out of the--.

UNITED STATES PATENT AND TRADEMARK OFFICE
CERTIFICATE OF CORRECTION

| | |
|---|---|
| PATENT NO. | : 7,422,372 B2 |
| APPLICATION NO. | : 11/434875 |
| DATED | : September 9, 2008 |
| INVENTOR(S) | : Yoshimasu Yamaguchi et al. |

It is certified that error appears in the above-identified patent and that said Letters Patent is hereby corrected as shown below:

<u>COLUMN 11</u>:
     Line 39, "comprises;" should read --comprises:--.

Signed and Sealed this

Seventeenth Day of March, 2009

JOHN DOLL
*Acting Director of the United States Patent and Trademark Office*